(12) United States Patent
Nishimoto

(10) Patent No.: US 7,636,203 B2
(45) Date of Patent: Dec. 22, 2009

(54) LENS BARREL

(75) Inventor: Naoki Nishimoto, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/406,249

(22) Filed: Apr. 19, 2006

(65) Prior Publication Data

US 2006/0250702 A1    Nov. 9, 2006

(30) Foreign Application Priority Data

| Apr. 20, 2005 | (JP) | ............ P.2005-122751 |
| Apr. 20, 2005 | (JP) | ............ P.2005-122752 |
| Apr. 20, 2005 | (JP) | ............ P.2005-122753 |

(51) Int. Cl.
  G02B 15/14 (2006.01)
  G02B 7/02 (2006.01)
(52) U.S. Cl. ............. 359/699; 359/703; 359/704; 359/819
(58) Field of Classification Search ............ 359/819, 359/811, 813, 699, 703, 704, 822, 823, 826, 359/827
  See application file for complete search history.

(56) References Cited

U.S. PATENT DOCUMENTS 6,390,693 B1 *   5/2002   Miyamoto et al. .......... 396/529
2005/0163494 A1 * 7/2005  Fukumoto et al.

FOREIGN PATENT DOCUMENTS

| JP | 6-51373       | * | 7/1992 |
| JP | 2000-29116 A  |   | 1/2000 |
| JP | 2002-189238 A |   | 7/2002 |
| JP | 2003-255210 A |   | 9/2003 |
| JP | 2003-348398 A |   | 12/2003 |
| JP | 2004-347624 A |   | 12/2004 |

* cited by examiner

Primary Examiner—Scott J Sugarman
Assistant Examiner—Brandi N Thomas
(74) Attorney, Agent, or Firm—Birch, Stewart, Kolasch & Birch, LLP

(57) ABSTRACT

A lens barrel is provided and includes: a lens barrel main body; and a connecting member attached to the barrel main body and connected to a camera. The connecting member includes an optical filter unit, divided at a position of the optical filter unit and is constituted by a barrel side member and a camera side member.

8 Claims, 9 Drawing Sheets

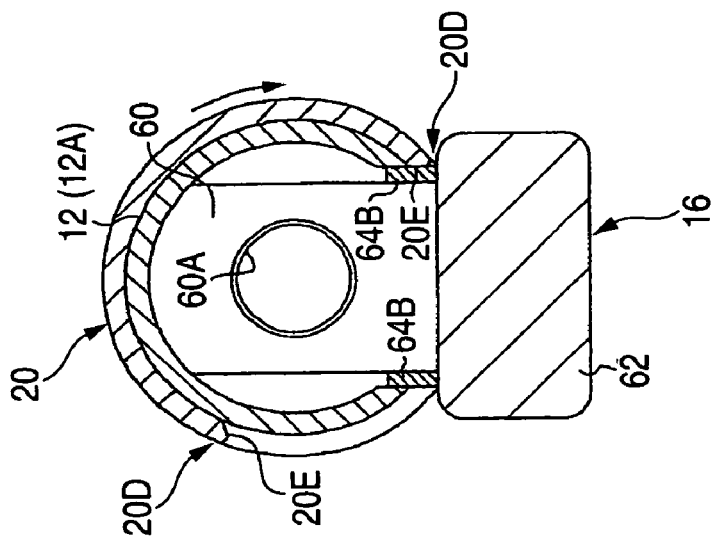
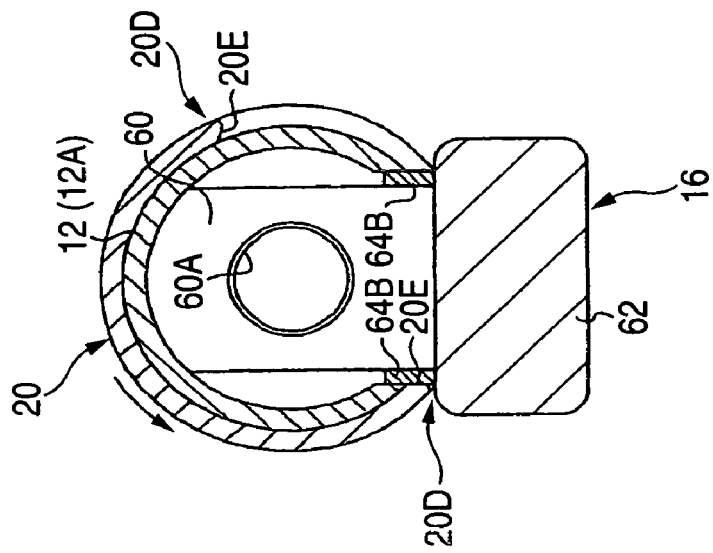
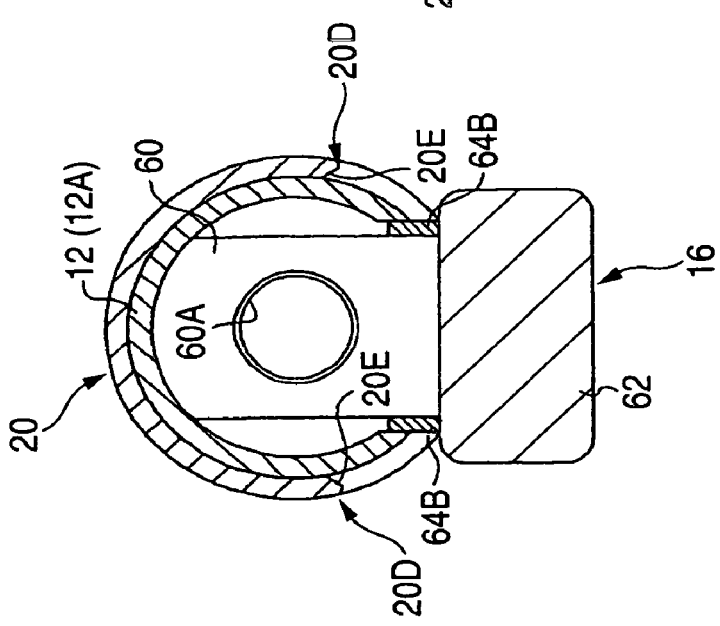

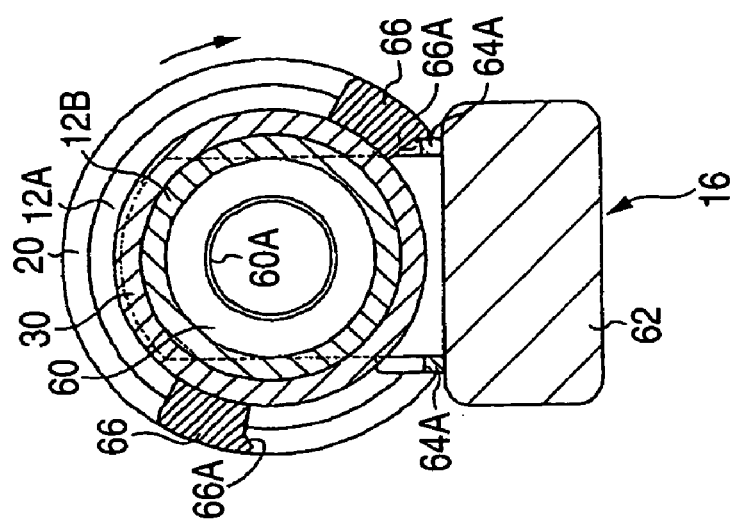
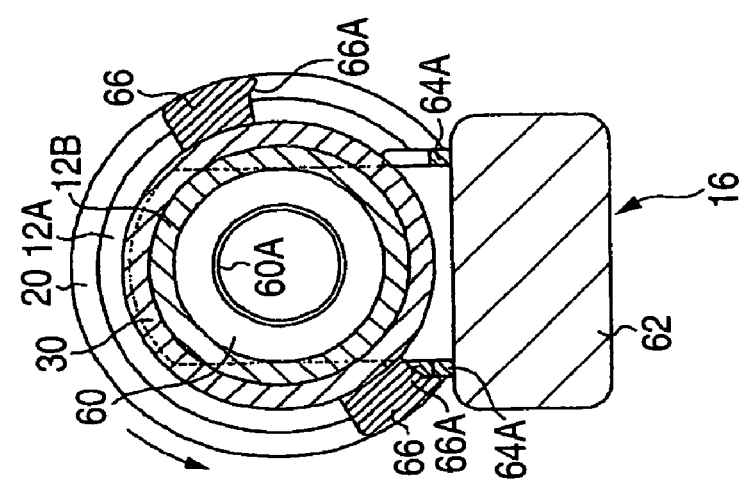
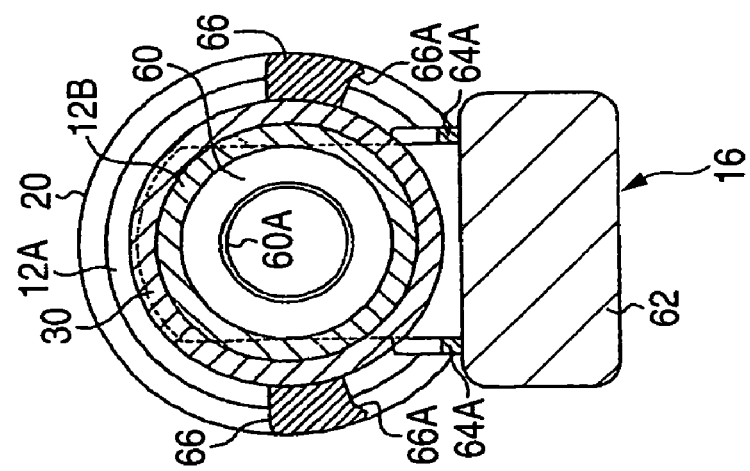

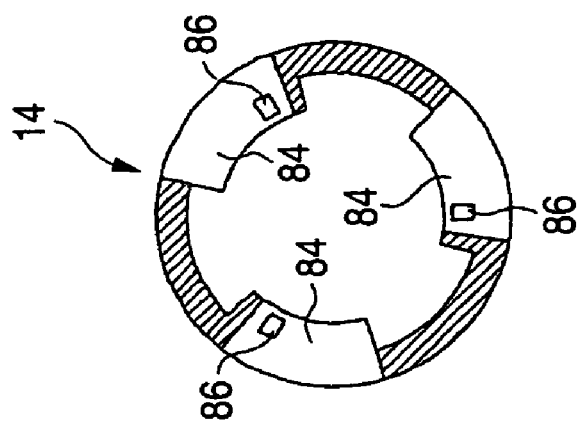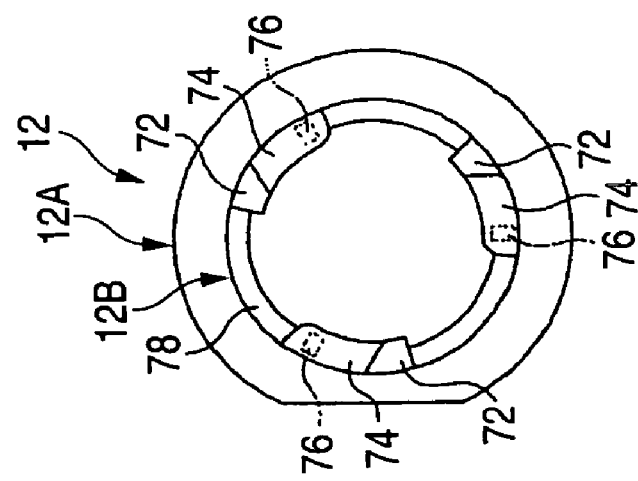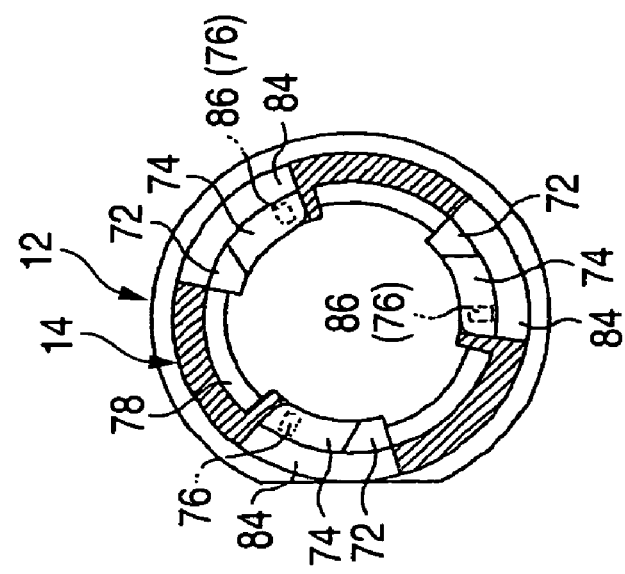

LENS BARREL

FIELD OF THE INVENTION

The present invention relates to a lens barrel, particularly relates to a lens barrel mounted to a monitoring camera.

BACKGROUND OF THE INVENTION

A lens apparatus of a monitoring camera is attached to the monitoring camera by fastening a mount ring provided at a rear end portion in an optical axis direction of a lens barrel main body to a main body of the monitoring camera (refer to JP-A-2003-255210). Various shapes of the mount rings of the lens apparatus need to be prepared in accordance with a shape, a position of CCD on a side of the camera, a heat radiating characteristic of CCD and the like. Therefore, in a background art, a number of the mount rings having different shapes are prepared, selected in accordance with a specification of a camera and mounted thereto.

Meanwhile, a mount ring of a lens apparatus needs high working accuracy at a portion thereof connected to a lens barrel main body and therefore, there poses a problem that a die in molding the mount ring by a resin is expensive, and fabrication cost is high. Therefore, there poses a problem that cost of a lens barrel is significantly increased by preparing a number of kinds of the mount rings.

A monitoring camera for taking an image day and night provides a picture image by utilizing an infrared ray in taking an image at night, and an infrared ray needs to be cut in taking an image in daytime. Therefore, a lens apparatus of the monitoring camera for taking an image day and night is provided with a filter switching apparatus for arranging an IR cut filter on an optical path, or escaping the IR cut filter from the optical path. Further, the monitoring camera can take an image day and night by arranging the IR cut filter on the optical path in taking an image in daytime and escaping the IR cut filter from the optical path at night by using the filter switching apparatus.

The IR cut filter and the filter switching apparatus are normally attached to a frame or a base seat to be unitized, which is integrated to a lens barrel. For example, according to a lens barrel described in JP-A-2004-347624, an optical filter is slidably supported by a guide frame, a unit of a filter switching apparatus is attached to a base seat, and these units are integrated to between a mount and a fixed cylinder.

However, the lens barrel of JP-A-2004-347624 needs a guide frame or a base seat and therefore, a problem that the apparatus is large-sized is posed. Further, the lens barrel of JP-A-2004-347624 poses a problem that a back focus (a distance from an apex of a final refracting face of a lens to a focusing face) is prolonged by an amount of a thickness of the guide frame or the base seat to deteriorate optical properties.

JP-A-2002-189238 and JP-A-2003-348398 describe a lens barrel in which an optical filter and a filter switching apparatus are integrated to a diaphragm apparatus. According to the lens barrel, the lens barrel can be downsized in an optical axis direction by attaching the optical filter and the filter switching apparatus to a board of the diaphragm apparatus.

However, since the lens barrel of JP-A-2002-189238 and JP-A-2003-348398 is provided with the optical filter and the filter switching apparatus at the diaphragm apparatus, there poses a problem that a thickness of a total of the diaphragm apparatus is increased, movable ranges of optical lenses on front and rear sides of the diaphragm apparatus are restricted, and optical properties are deteriorated.

Further, the lens barrel of JP-A-2002-189238 and JP-A-2003-348398 also poses a problem that when the optical filter is not needed, the total of the diaphragm apparatus needs to be interchanged, and cost is increased.

A lens barrel is connected to a camera by way of a connecting member referred to as lens mount. Normally, the lens barrel and the connecting member are fixed by a screw or the like. The connecting member needs a sufficient mechanical strength for preventing the connecting member from being destructed by unpreparedly strong force or impact in mounting to the camera. Therefore, with regard to the connecting member of the lens barrel, in a background art, there have been proposed various connecting members for increasing the mechanical strength.

For example, JP-A-2000-29116 describes a connecting member in which a portion thereof screwed to be fixed to a lens barrel and a bayonet claw engaged with a camera are reinforced by metal members. According to the connecting member, strengths of a portion screwed to be fixed thereto and the bayonet claw are increased and therefore, the connecting member can be fixed to the lens barrel by a solid fastening force, further, a force of engaging the connecting member of the camera can be increased. Thereby, the connecting member can be prevented from being destructed by an unpreparedly strong force or impact in mounting to the camera.

However, JP-A-2000-29116 poses a problem that warp is brought about at a barrel main body of the lens barrel by fixing the connecting member to the lens barrel by a strong fastening force. Further, by bringing about warp at the barrel main body, there is brought about a drawback that a resistance of sliding an operating ring of a focus ring, a zoom ring or the like and the barrel main body is increased and operability is deteriorated.

Further, JP-A-2000-29116 poses a problem that when the connecting member is screwed to be fixed to the lens barrel by the strong fastening force, a thread ridge of a female screw on a side of the barrel main body is destructed, and the barrel main body per se needs to be interchanged.

SUMMARY OF THE INVENTION

An object of an illustrative, non-limiting embodiment of the invention is to provide a lens barrel capable of being mounted to a number of kinds of cameras having different specifications and capable of reducing fabrication cost.

Another object of an illustrative, non-limiting embodiment of the invention is to provide a lens barrel capable for promoting optical properties and capable of being downsized.

Still another object of an illustrative, non-limiting embodiment of the invention is to provide a lens barrel capable of firmly fixing a connecting member to a barrel main body of a lens barrel and capable of preventing the barrel main body from being warped or damaged.

The following means can achieve the above-described objects.

(1) A lens barrel is characterized in including: a barrel main body; and a connecting member attached to the barrel main body and connected to a camera, wherein the connecting member is constituted by being divided into a portion on a side of the barrel main body (a first portion) and a portion on a side of the camera (a second portion).

According to an embodiment described in (1), the connecting member is divided into the side of the barrel main body which needs high working accuracy and the side of the camera which does not need high working accuracy but needs a number of kinds of shapes and therefore, cost of a total of the connecting member can be reduced. That is, according to an embodiment of (1), cost of the total of the connecting member can be reduced by commonly using the portion on the side of the barrel main body which needs high working accuracy for a plurality of cameras and preparing a number of kinds of only the portion on the side of the camera which does not need high working accuracy in accordance with a specification of the camera.

(2) The lens barrel according to (1) is characterized in that an optical filter is arranged between the portion on the side of the barrel main body and the portion on the side of the camera.

According to an embodiment of (2), the optical filter is arranged between the portion on the side of the barrel main body and the portion on the side of the camera and therefore, the optical filter can easily be integrated to inside of the connecting member.

(3) The lens barrel according to (2) is characterized in that the connecting member is formed with a recess portion for containing (housing) the optical filter at least one dividing face of the portion on the side of the barrel main body and the portion on the side of the lens. (That is, at least one portion of the portion on the side of the barrel main body and the portion on the side of the camera has a recess portion on a face opposite to the other portion.)

According to an embodiment of (3), the recess portion for containing the optical filter is formed at the dividing face and therefore, when the portion on the side of the barrel main body and the portion on the side of the lens are integrated, inside of the connecting member is formed with a hollow portion constituting a space of containing the optical filter.

(4) The lens barrel according to any one of (1) to (3) is characterized in that the portion on the side of the barrel main body and the portion on the side of the camera are fixed by screwing or a snap in mechanism.

(5) A lens barrel is characterized in including: an optical filter; and filter inserting and drawing means capable of inserting or drawing the optical filter on an optical path, wherein the optical filter and the filter inserting and drawing means are integrated to a connecting member attached to a barrel main body and connected to a camera.

According to an embodiment of (5), the optical filter and the filter inserting and drawing means are integrated to the connecting member and therefore, a frame for holding the optical filter and a base seat of the filter inserting and drawing means are dispensed with. Therefore, the lens barrel can be downsized.

Further, according to an embodiment of (5), by integrating the optical filter and the filter inserting and drawing means to the connecting member, a movable range of a lens is not restricted by the optical filter and the like. Therefore, optical properties can be promoted.

(6) The lens barrel according to (5) is characterized in that the connecting member is divided at a position of the optical filter and is constituted by a member on a side of the barrel main body and a member on a side of the camera.

According to an embodiment of (6), the optical filter can easily be included in the connecting member.

(7) A lens barrel is characterized in including: a barrel main body and; a connecting member fixed to the barrel main body and connected to a camera, wherein one of the barrel main body and the connecting member is provided with an elastically deformable arm having a claw at a front end portion thereof, and the other of the barrel main body and the connecting member is provided with an engaging portion engaged with the claw of the arm. That is, an embodiment of (7) is characterized in connecting the barrel main body and the connecting member by using a snap in mechanism. Thereby, according to an embodiment of (7), the barrel main body and the connecting member are connected always by a pertinent force by an elastic force of the arm and therefore, the barrel main body can be prevented from being warped in connecting the barrel main body and the connecting member. Thereby, a feeling of operating an operating ring can be promoted.

Further, according to an embodiment of (7), the barrel main body and the connecting member are connected by using the snap in mechanism therefor, a fixing member of a screw or the like is dispensed with, and a tool of a screwdriver or the like is dispensed with. Therefore, according to an embodiment of (7), the barrel main body and the connecting member can be connected easily and at low cost.

(8) The lens barrel according to (7) is characterized in that the arm is formed in a peripheral direction centering on an optical axis. According to an embodiment of (8), by rotating the connecting member in the peripheral direction relative to the barrel main body, a claw of the arm is engaged with the engaging portion, and the connecting member and the barrel main body are connected. In this way, when the connecting member is rotated in the peripheral direction and connected to the barrel main body, the connecting member and the barrel main body can be connected in a state of being positioned in a direction of an optical axis. Therefore, optical properties of the lens barrel can be promoted.

According to an exemplary embodiment of the invention, the connecting member is constructed by a constitution of being divided into the side of the barrel main body which needs high working accuracy and the side of the camera which does not need high working accuracy but needs a number of kinds of shapes and therefore, the portion on the side of the barrel main body having high cost can commonly be used for a plurality of cameras. Thereby, cost of a total of the lens barrel can be reduced even when used in a plurality of cameras having different specifications.

Since the optical filter and the filter inserting and drawing means are integrated to the connecting member, the lens barrel can be downsized, and optical properties can be promoted by widening a movable range of a lens.

According to another embodiment of the invention, the barrel main body of the lens barrel and the connecting member are connected by using the snap in mechanism and therefore, the barrel main body and the connecting member can be connected always by a pertinent force and the barrel main body can be prevented from being warped in connecting the barrel main body and the connecting member. Further, the barrel main body and the connecting member are connected by using the snap in mechanism and therefore, a fixing member of a screw or the like or a tool for fixing is dispensed with, and the barrel main body and the connecting member can be connected easily and at low cost.

BRIEF DESCRIPTION OF THE INVENTION

FIGS. 3A to 3C illustrate sectional views for explaining restriction of pivoting a focus ring.

FIGS. 4A to 4C illustrate sectional views for explaining restriction of pivoting a zoom ring.

FIGS. 7A to 7C are sectional views taken along a line 5-5 of FIG. 6.

DETAILED DESCRIPTION OF THE INVENTION

An explanation will be given of exemplary embodiments of a lens barrel according to the invention in reference to the attaching drawings as follows.

FIRST EMBODIMENT

Figure 1:
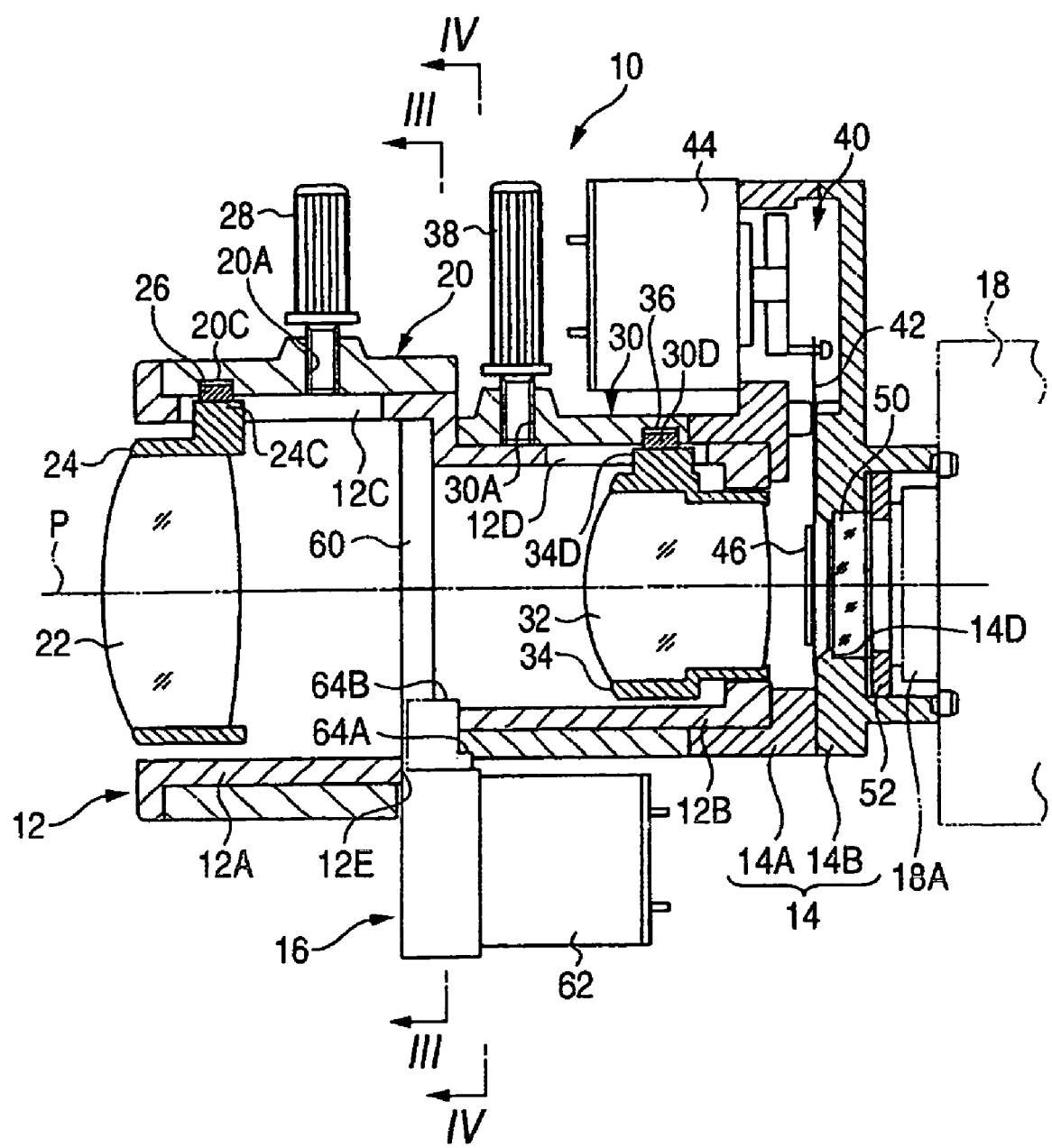
FIG. 1 is a sectional view showing a constitution of a lens barrel according to an exemplary embodiment of the invention.

FIG. 1 is a side sectional view showing a constitution of a lens barrel 10 mainly mounted to a monitoring camera. The lens barrel 10 shown in the drawing is mainly constituted by a barrel main body 12 (also referred to as fixed cylinder) substantially in a cylindrical shape, a connecting member 14 (also referred to as mount) attached to a base end portion of the barrel main body 12 and connected to a camera 18, and a diaphragm apparatus 16 inserted into the barrel main body 12 from a side of a peripheral face thereof to be mounted thereto.

The barrel main body 12 comprises a large diameter portion 12A on a front end side and a small diameter portion 12B on a base end side, and the large diameter portion 12A and the small diameter portion 12B are integrally molded by a resin. A focus ring 20 is pivotably supported by an outer peripheral face of the large diameter portion 12A, and a zoom ring 30 is pivotably supported by an outer peripheral face of the small diameter portion 12B.

Inside of the large diameter portion 12A of the barrel main body 12 is arranged with a focus lens (group) 22 held by a lens frame 24 on an optical axis P. An outer peripheral face of the lens frame 24 is projected with an engaging portion 24C, and the engaging portion 24C is engaged with a straight advancing groove 12C formed in a direction of the optical axis P. Thereby, the lens frame 24 and the focus lens (group) 22 are movably supported in a direction of the optical axis P.

The engaging portion 24C of the lens frame 24 is projected with a cam pin 26 and the cam pin 26 is engaged with a cam groove 20C formed on an inner peripheral face of the focus ring 20. Therefore, when the focus ring 20 is operated to pivot, a position of intersecting the cam groove 20C and the straight advancing groove 12C is displaced in the direction of the optical axis P, and the lens frame 24 and the focus lens (group) 22 are moved in the direction of the optical axis P in accordance with displacement of the intersecting position. Thereby, the focus lens (group) 22 is moved in the direction of the optical axis P to adjust to focus. Further, it is preferable to provide a plurality of engaging portions each comprising the engaging portion 24C of the lens frame 24, the cam pin 26, the cam groove 20C of the focus ring 20, and the straight advancing groove 12C of the barrel main body 12 in order to stably move the lens frame 24, normally, the engaging portions are provided at three locations constituted by equally dividing a circumference by three.

Further, the focus ring 20 is formed with a screw hole 20A penetrated from the outer peripheral face to the inner peripheral face, and a knob 28 is screwed to be attached to the screw hole 20A. An operator can also operate to pivot the focus ring 20 by using the knob 28. Further, the focus ring 20 can be fixed at a desired focus adjusting position by screwing the knob 28 to press a front end thereof to the outer peripheral face of the large diameter portion 12A of the barrel main body 12.

Inside of the small diameter portion 12B of the barrel main body 12 is arranged with a zoom lens (group) 32 held by a lens frame 34 on the optical axis P. An outer peripheral face of the lens frame 34 is projected with an engaging portion 34D, and the engaging portion 34D is engaged with a straight advancing groove 12D formed in the direction of the optical axis P. Thereby, the lens frame 34 and the zoom lens (group) 32 are movably supported in the direction of the optical axis P.

The engaging portion 34D of the lens frame 34 is projected with a cam pin 36, and the cam pin 36 is engaged with a cam groove 30D formed at an inner peripheral face of the zoom ring 30. Therefore, when the zoom ring 30 is operated to pivot, a position of intersecting the cam groove 30D and the straight advancing groove 12D is displaced in the direction of the optical axis P, and the lens frame 34 is moved in the direction of the optical axis P in accordance with displacement of the intersecting position. Thereby, the zoom lens 32 is moved in the direction of the optical axis P and a focal length (zoom picture angle) is adjusted. Further, it is preferable to provide a plurality of engaging portions each comprising the engaging portion 34D of the lens frame 34, the cam pin 36, the cam groove 30D of the zoom lens 30, and the straight advancing groove 12D of the barrel main body 12 in order to stably move the lens frame 34, normally, the engaging portions are provided at three locations constituted by equally dividing a circumference by three.

Further, the zoom ring 30 is formed with a screw hole 30A penetrated from the outer peripheral face to the inner peripheral face, and a knob 38 is screwed to be attached to the screw hole 30A. The operator can also operate to pivot the focus ring 30 by using the knob 38. Further, the zoom ring 30 can be fixed at a desired focal length adjusting position by screwing the knob 38 to press a front end thereof to an outer peripheral face of the small diameter portion 12B of the barrel main body 12.

Figure 2:
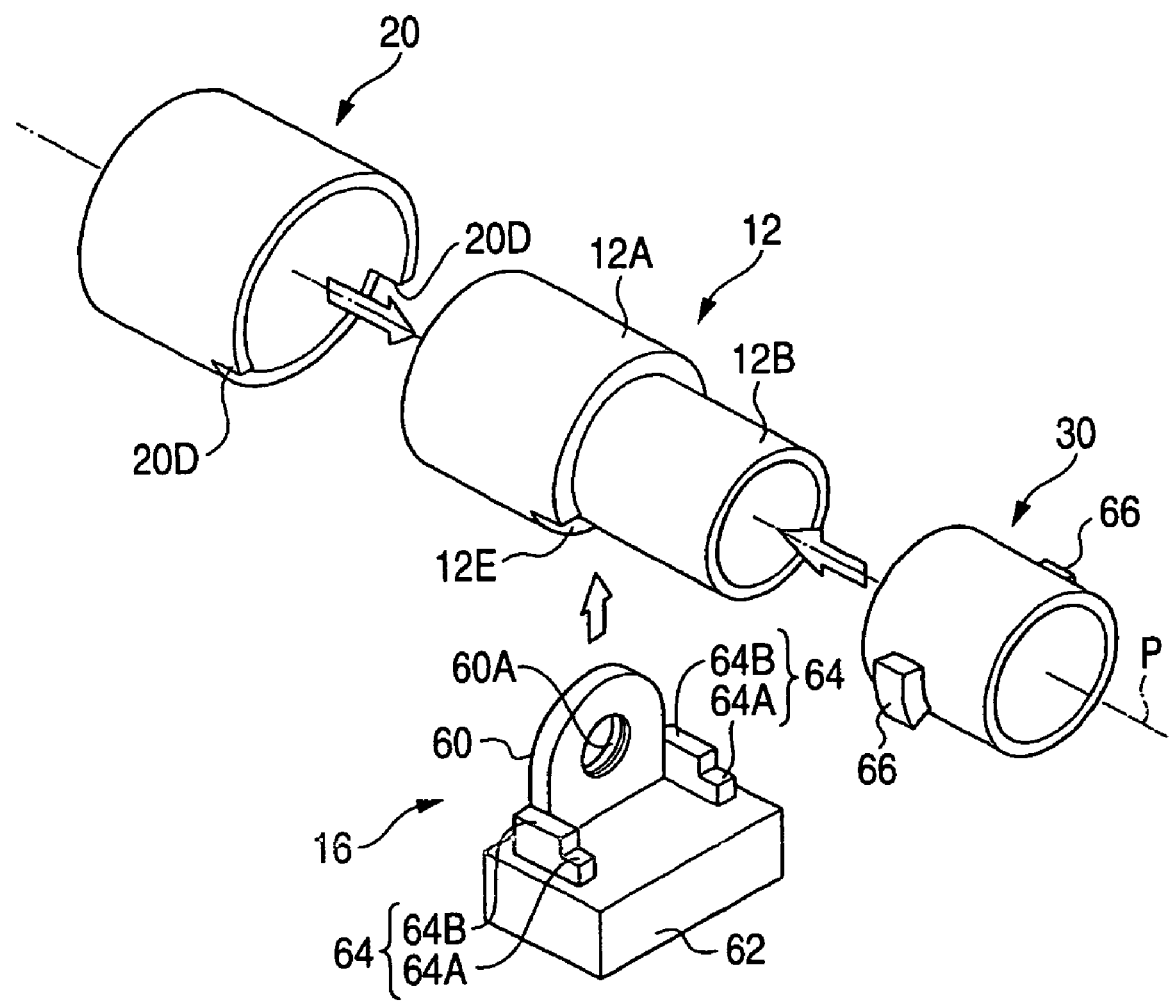
FIG. 2 is a disassembled perspective view of the lens barrel.

As shown by FIG. 2, the diaphragm apparatus 16 includes a casing 60 in a plate-like shape, and the casing 60 is inserted to be mounted to the barrel main body 12. Specifically, a boundary portion of the large diameter portion 12A and the small diameter portion 12B of the barrel main body 12 is formed with an opening portion 12E in a slit-like shape in a circumferential direction, and the plate-like casing 60 is inserted to be mounted to the opening portion 12E in the slit-like shape in a direction orthogonal to the optical axis P. The casing 60 and the barrel main body 12 are connected by a snap in structure, not illustrated. That is, the casing 60 is provided with an elastically deformable arm, and a front end of the arm is formed with a claw for engaging. Further, by fitting the claw for engaging to a groove of the barrel main body 12, the casing 60 of the diaphragm apparatus 16 is mounted to the barrel main body 12. Further, a method of connecting the diaphragm apparatus 16 and the barrel main body 12 is not limited to the snap in structure but other connecting method of screwing by screw or the like can also be selected.

The casing 60 is formed with an opening 60A in a circular shape, and the opening 60A is arranged on the optical axis P when the casing 60 is mounted to the barrel main body 12. Further, inside of the casing 60 is provided with two sheets of diaphragm blades (not illustrated), one of the diaphragm blades is arranged on an upper side of the opening 60A, and the other of the diaphragm blades is arranged on a lower side of the opening 60B. The respective diaphragm blades are supported slidably in an up and down direction, and the respective diaphragm blades are moved in the up and down direction by driving a drive portion (iris meter or the like) 62 attached to a lower end of the casing 60. Further, the opening 60A is closed by two sheets of the diaphragm blades by moving the diaphragm blade arranged on the upper side of the opening 60A to the lower side and moving the diaphragm blade arranged on the lower side of the opening 60A to the upper side to bring about a state in which object light does not pass therethrough. Further, two sheets of the diaphragm blades are escaped from the opening 60A by moving the diaphragm blade on the upper side to the upper side and moving the diaphragm blade on the lower side to the lower side by driving the drive portion 62 to bring about the state in which the object light can pass through a total of the opening 60A. Further, a constitution of the diaphragm apparatus 16 is not limited to the above-described but an iris diaphragm mechanism or the like may be used.

As shown by FIG. 2, the diaphragm apparatus 16 is provided with pivoting restricting portions 64, 64, and an operating ring of the focus ring 20, the zoom ring 30 or the like is restricted from being pivoted by the pivoting restricting portions 64, 64. The pivoting restricting portions 64, 64 are formed to be projected at a portion of connecting the casing 60 and the drive portion 62 of the diaphragm apparatus 16 and to both outer sides thereof. Further, each pivoting restricting portion 64 is constituted by a restricting portion 64B for focusing at a front end side and a restricting portion 64A for zooming on a base end side.

The diaphragm apparatus 16 constituted as described above is inserted to be mounted to the opening portion 14E of the barrel main body 12 after attaching the focus ring 20 and the zoom ring 30 to the barrel main body 12. Thereby, the pivoting restricting portion 64 of the diaphragm apparatus 16 is arranged at a predetermined position and restriction of pivoting the focus ring 20 and restriction of pivoting the zoom ring 30 are carried out by the pivoting restricting portion 64. That is, the focus ring 20 is restricted from being pivoted by the restricting portion 64B for focusing and the zoom ring 30 for zooming is restricted from being pivoted by the restricting portion 64A. Further, the pivoting restricting portions 64, 64 serve also as means for positioning the diaphragm apparatus 16 relative to the barrel main body 12 when the diaphragm apparatus 16 is inserted to be mounted to the barrel main body 12.

An explanation will be given of restriction of pivoting the focus ring 20 in reference to FIG. 2 and FIGS. 3A through 3C as follows. FIGS. 3A through 3C show a section taken along a line 3-3 of FIG. 1, FIG. 3A shows a state in which there is not pivoting operation, and FIG. 3B, FIG. 3C show states of carrying out pivoting operation in directions respectively inverse to each other and pivoting operation is restricted.

As shown by FIG. 2, a portion of an end face on a base end side of the focus ring 20 (specifically, substantially ⅔ on an upper side) is projected, and the projected portion is formed with stepped difference portions 20D, 20D at both end portions of the projected portion. The stepped difference portions 20D, 20D are projected from a base end of the large diameter portion 12A of the barrel main body 12 to be arranged on the small diameter portion 12B when the focus ring 20 is mounted to the barrel main body 12. Further, as shown by FIG. 3A, the stepped difference portions 20D, 20D include inclined faces 20E, 20E cut skewedly and the inclined faces 20E are constituted to be brought into face contact with the restricting portions 64B for focus when the focus ring 20 is pivoted as shown by FIG. 3B or FIG. 3C.

When the focus ring 20 constituted as described above is operated to pivot from the state shown in FIG. 3A in the counterclockwise direction, as shown by FIG. 3B, the inclined face 24E of the stepped difference portion 20D is brought into contact with the restricting portion 64B for focusing to restrict pivoting operation of the focus ring 20. Further, when the focus ring 20 is operated to pivot in the clockwise direction from the state shown in FIG. 3A, as shown by FIG. 3C, the inclined face 20E of the stepped difference portion 20D on an opposed side is brought into contact with the restricting portion 64B for focusing to restrict pivoting operation of the focus ring 20. Thereby, the focus ring 20 can be set to an accurate operation range and focusing operation can accurately be carried out.

Next, pivoting restriction of the zoom ring 30 will be explained in reference to FIG. 2 and FIGS. 4A through 4C. FIGS. 4A through 4C show a section taken along a line 4-4 of FIG. 1, FIG. 4A shows a state in which there is not pivoting operation, and FIG. 4B, FIG. 4C show states in which pivoting operation is carried out in directions respectively inverse to each other and pivoting operation is restricted.

As shown by FIG. 4A, the zoom ring 30 is provided with a projected portion 26 projected from an outer peripheral face. The projected portion 66 comprises, for example, a resin and is integrally formed with the zoom ring 30. Further, as shown by FIG. 4A, it is preferable to form the projected portion 66 by a range smaller than that in the focus ring 20. Further, the projected portions 66 are formed with contact faces 66A, 66A brought into face contact with the restricting portions 64A, 64A for zooming when the zoom ring 30 is operated to pivot as shown by FIG. 4B or FIG. 4C.

When the zoom ring 30 constituted as described above is operated to pivot in the counterclockwise direction from the state shown in FIG. 4A, as shown by FIG. 4B, the projected portion 66 is brought into contact with the restricting portion 64A for zooming to restrict pivoting operation of the zoom ring 30. Further, when the zoom ring 30 is operated to pivot in the clockwise direction from the state shown in FIG. 4A, as shown by FIG. 4C, the projected portion 66 is brought into contact with the restricting portion 64A for zooming to restrict pivoting operation of the zoom ring 30. Thereby, the zoom ring 30 can be set to an accurate operation range, and zoom operation can accurately be carried out.

Figure 5:
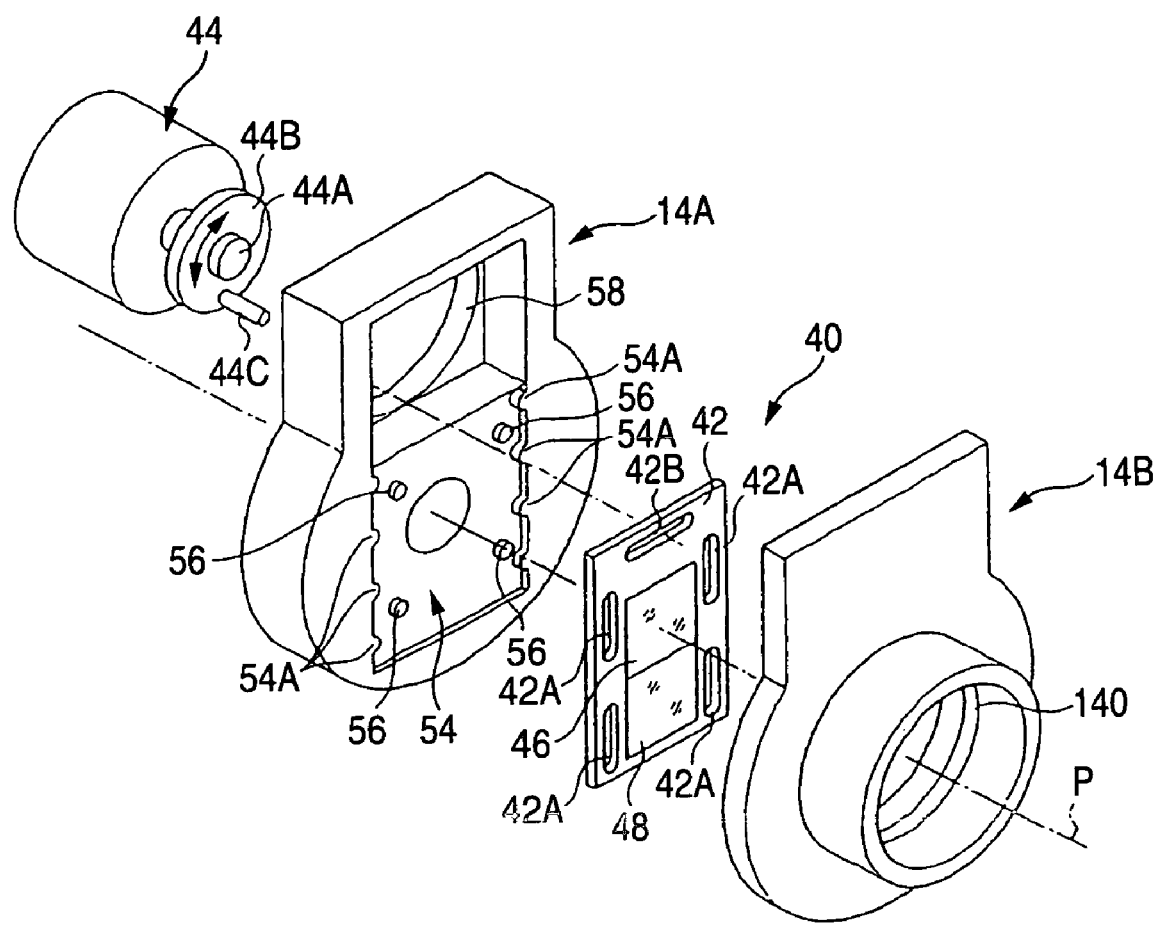
FIG. 5 is a perspective view showing a constitution of a connecting member.

On the other hand, the connecting member 14 shown in FIG. 1 is a member for connecting the barrel main body 12 and the camera 18 and is attached to a base end of the small diameter portion 12B of the barrel main body 12. An optical filter unit 40, mentioned later, is included at inside of the connecting member 14, and the connecting member 14 is constructed by a constitution of being divided in two at a position of an IR cut filter 46 (in correspondence with an optical filter) of the optical filter unit 40. That is, as shown by FIG. 5, the connecting member 14 is constituted by a barrel side member 14A on a side of the barrel main body 12 of a filter attaching plate 42 of the IR cut filter 46 (left depth side of FIG. 5), and a camera side member 14B on a side of the camera 18 of the filter attaching plate 42 (right front side of FIG. 5), and the connecting member 14 is constituted by connecting the barrel side member 14A and the camera side member 14B. Further, although a method of connecting the barrel side member 14A and the camera side member 14B is not particularly limited, for example, a connecting method utilizing a screw, or a fixing method using a snap in structure is adopted.

The optical filter unit 40 mainly comprises the filter attaching plate 42 and an actuator 44 for inserting and drawing the filter attaching plate 42 relative to the optical axis P, and the filter attaching plate 42 is arranged with the IR (infrared ray) cut filter 46 and a dummy filter 48 aligned in an up and down direction. Further, an ND filter or a visible light cut filter may be arranged in place of the IR cut filter 46 and the dummy filter 48.

The filter attaching plate 42 is formed with a plurality of guide holes 42A prolonged in the up and down direction, the respective guide holes 42A are inserted with a plurality of guide pins 56 projected from the barrel side member 14A of the connecting member 14 to be guided thereby. Thereby, the filter attaching plate 42 is supported by the barrel side member 14A slidably in the up and down direction.

Further, an upper portion of the filter attaching plate 42 is formed with a long hole 42B in a lateral direction, and the long hole 42B is inserted with an arm 44C of the actuator 44 to be guided thereby.

A main body of the actuator 44 is mounted to an attaching portion 58 at an upper portion of the barrel side member 14A to be held thereby. Although a method of mounting the actuator 44 to the barrel side member 14A is not particularly limited, fixing by a screw, or a snap in structure is used therefor.

Further, the actuator 44 includes a rotating shaft 44A, the rotating shaft 44A is attached with a circular disk 44B, and the arm 44C is erected from an outer peripheral portion of the circular disk 44B. Further, the arm 44C is inserted into the long hole 48B of the filter attaching plate 42 to be engaged therewith.

According to the optical filter unit 40 constituted as described above, when the rotating shaft 44A is rotated by driving the actuator 44, the circular disk 44B is rotated and the arm 44C is moved around the rotating shaft 44A, and the filter attaching plate 42 is moved in the up and down direction in accordance with movement of the arm 44C. Thereby, the optical filter arranged on the optical axis P can be switched to the IR cut filter 46 and the dummy filter 48. Therefore, by arranging the IR cut filter 46 on the optical axis P when an image is taken in daytime and arranging the dummy filter 48 on the optical axis P when an image is taken at night, the image can be taken both in daytime and at night.

As shown by FIG. 1, the barrel side member 14A of the connecting member 14 is fixed to the base end portion of the small diameter portion 12B of the barrel main body 12. Although a method of fixing the barrel side member 14A and the small diameter portion 12B is not particularly limited, for example, the barrel side member 14A and the small diameter portion 12B are connected by a snap in structure. Further, the barrel side member 14A needs to be positioned relative to focus lens 22 and the zoom lens 32 and therefore, high working accuracy is needed therefor.

Further, as shown by FIG. 5, the barrel side member 14A is formed with a recess portion 54 for containing the filter attaching plate 42 at a face thereof connected to the camera side member 14B (dividing face). The recess portion 54 is provided with a space for sliding the filter attaching plate 42 in the up and down direction, and a side face of the recess portion 54 is projected to be formed with a plurality of projected portions 56 in a circular arc shape for guiding the filter attaching plate 42 at constant intervals. Therefore, the filter attaching plate 42 can be slid in the up and down direction in a state of being contained in the recess portion 54.

On the other hand, the camera side member 14B includes a stepped difference 14D for holding LPF (low path filter) 50 (refer to FIG. 1) on the optical axis P, in a state of arranging LPF 50 to the stepped difference 14D and arranging a rubber member 52 in a plate-like shape, a front end portion of the camera 18 is inserted to be mounted thereby. The camera 18 mounted in the embodiment is the camera 18 referred to as a built-in type in which CCD 18A and an attaching board thereof are exposed.

Whereas the camera side member 14B mounted with the camera 18 does not need working accuracy as high as that of the barrel side member 14A, various shapes need to be prepared for the camera side member 14B in accordance with a specification (shape, position, heat radiating property and the like) of the camera 18.

The connecting member 14 constituted as described above is assembled as follows. First, the connecting member 14 is divided into the barrel side member 14A and the camera side member 14B, and the barrel side member 14A is attached to the small diameter portion 12B of the barrel main body 12. Next, the actuator 44 of the optical filter unit 40 is mounted to the mounting portion 58 at the upper portion of the barrel side member 14A. Further, the filter attaching plate 42 is attached thereto by inserting the guide pins 56 of the barrel side member 14A into the plularity guide holes 42A of the filter attaching plate 42 and inserting the arm 44C of the actuator 44 to the long hole 42B of the filter attaching plate 42. Successively, the camera side member 14B is connected to the barrel side member 14A. Thereby, the connecting member 14 is mounted to the base end portion of the barrel main body 12 and the optical filter unit 40 is included at inside thereof. Further, the connecting member 14 may be attached to the barrel main body 12 after integrating the optical filter unit 40 to inside of the connecting member 14.

Operation of the lens barrel 10 according to the embodiment will be explained as follows.

The connecting member 14 according to the embodiment is divided into the barrel side member 14A and the camera side member 14B, and the connecting member 14 is formed by connecting the barrel side member 14A and the camera side member 14B. The barrel side member 14A needs very high working accuracy for being connected to the barrel main body 12, and when the barrel side member 14A is molded by a resin, a very expensive die is needed. On the other hand, although the camera side member 14B does not need working accuracy as high as that of the barrel side member 14A, various shapes are needed in accordance with the specification of the camera 18 and a number of kinds of dies are needed in molding the camera side member 14B by a resin.

When the connecting member 14 is fabricated without being divided, a number of the connecting members 14 need to be fabricated by preparing dies with very high accuracy by a number of pieces thereof in accordance with the specification of the camera 18. Therefore, there poses a problem that by increasing the specifications of the cameras 18, a number of pieces of the connecting members 14 having high fabrication cost is increased and cost of a total of the lens barrel 10 is significantly increased.

In contrast thereto, according to the embodiment, the connecting member 14 is divided into the barrel side member 14A and the camera side member 14B and therefore, the barrel side member 14A having high fabrication cost can be used as a part common to a number of kinds of the cameras 18. Therefore, when the cameras 18 having different specifications are increased, the camera side member 14B having fabrication cost lower than that of the barrel side member 14A may be prepared in accordance with the kinds of the cameras 18 and therefore, the cost of the total of the lens barrel 10 can be reduced.

Further, according to the embodiment, the optical filter unit 40 is included in the connecting member 14, the connecting member 14 is divided at the position of the optical filter unit 40 and therefore, a space of containing the optical filter unit 40 can easily be formed at inside of the connecting member 14. That is, by forming the recess portion 54 at the barrel side member 14A of the connecting member 14 to connect, the space of containing the optical filter unit 40 can easily be formed at inside of the connecting member 14. Further, the recess portion 54 of the barrel side member 14A can easily be formed by only constituting a die for resin molding by a projected shape. Therefore, according to the embodiment, the connecting member 14 including the optical filter unit 40 can be fabricated at low cost.

Meanwhile, when the optical filter unit 40 is integrated to the barrel main body 12 separately from the connecting member 14, holding means (guide frame, base seat or the like) for holding the optical filter unit 40 is needed and therefore, a problem that the lens barrel 10 is large-sized by an amount of the holding means is posed. Further, when the optical filter unit 40 is integrated to the barrel main body 12 separately from the connecting member 14, there poses a problem that a range of moving an optical lens (focus lens 22, zoom lens 32 or the like) is restricted and therefore, an adverse influence is effected on optical properties.

In contrast thereto, according to the embodiment, the optical filter unit 40 is integrated to the connecting member 14, and the connecting member 14 serves also as holding means of the optical filter unit 40. Particularly, according to the embodiment, the barrel side member 14A of the connecting member 14 achieves a role of a guide and achieves a role as a base seat of the actuator 44. Therefore, it is not necessary to separately provide holding means of a guide frame, a base seat or the like for holding the optical filter unit 40, and the lens barrel 10 can be downsized.

Further, according to the embodiment, the optical filter unit 40 is integrated to the connecting member 14 and therefore, there is not a concern of restricting a range of moving the focus lens 22 or the zoom lens 32 by the optical filter unit 40, and optical properties can be promoted.

Further, according to the embodiment, the connecting member 14 is divided at a position of the filter attaching plate 42 of the optical filter unit 40 and therefore, the optical filter unit 40 can easily be integrated to the connecting member 14. That is, the optical filter unit 40 can easily be integrated to inside of the connecting member 14 by integrating the optical filter unit 40 and connecting the barrel side member 14A and the lens side member 14B in a state of dividing the connecting member 14 into the barrel side member 14A and the lens side member 14B.

Further, according to the embodiment, the connecting member 14 is divided at the position of the filter attaching plate 42 of the optical filter unit 40 and therefore, by forming the recess portion 54 at a connecting face of the barrel side member 14A, a space for containing the optical filter unit 40 can easily be formed at inside of the connecting member 14.

Further, according to the embodiment, when the optical filter unit 40 is not used, only the connecting member 14 may be interchanged, and cost can be reduced.

Further, according to the embodiment, the connecting member 14 is divided into the barrel side member 14A and the camera side member 14B and therefore, the barrel side member 14A having a high fabrication cost can be used as a common part in a number of kinds of the cameras 18. Therefore, when the kinds of the cameras 18 are increased, the camera side member 14B having fabrication cost lower than that of the barrel side member 14A may be prepared in accordance with the kinds of the cameras 18 and therefore, cost of a total of the lens barrel 10 can be reduced.

Further, although according to the above-described embodiment, the barrel side member 14A is formed with the recess portion 54 for containing the plate attaching plate 42, the recess portion may be formed at the camera side member 14B, or the recess portion may be formed at both of the barrel side member 14A and the camera side member.

Further, although according to the embodiment, the connecting member 14 is divided at the position of the optical filter unit 40, the dividing position is not limited thereto but the connecting member 14 may divide the side of the barrel main body 12 and the side of the camera 18.

Further, although according to the embodiment, the optical filter unit 40 is directly integrated to the connecting member 14, the optical filter unit 40 may be contained in a case or the like and the case may be mounted to the connecting member 14. That is, the side face of the connecting member 14 may be formed with an opening in a slit-like shape and the case containing the optical filter unit 40 may be inserted into the opening to be mounted thereby.

SECOND EMBODIMENT

Figure 6:
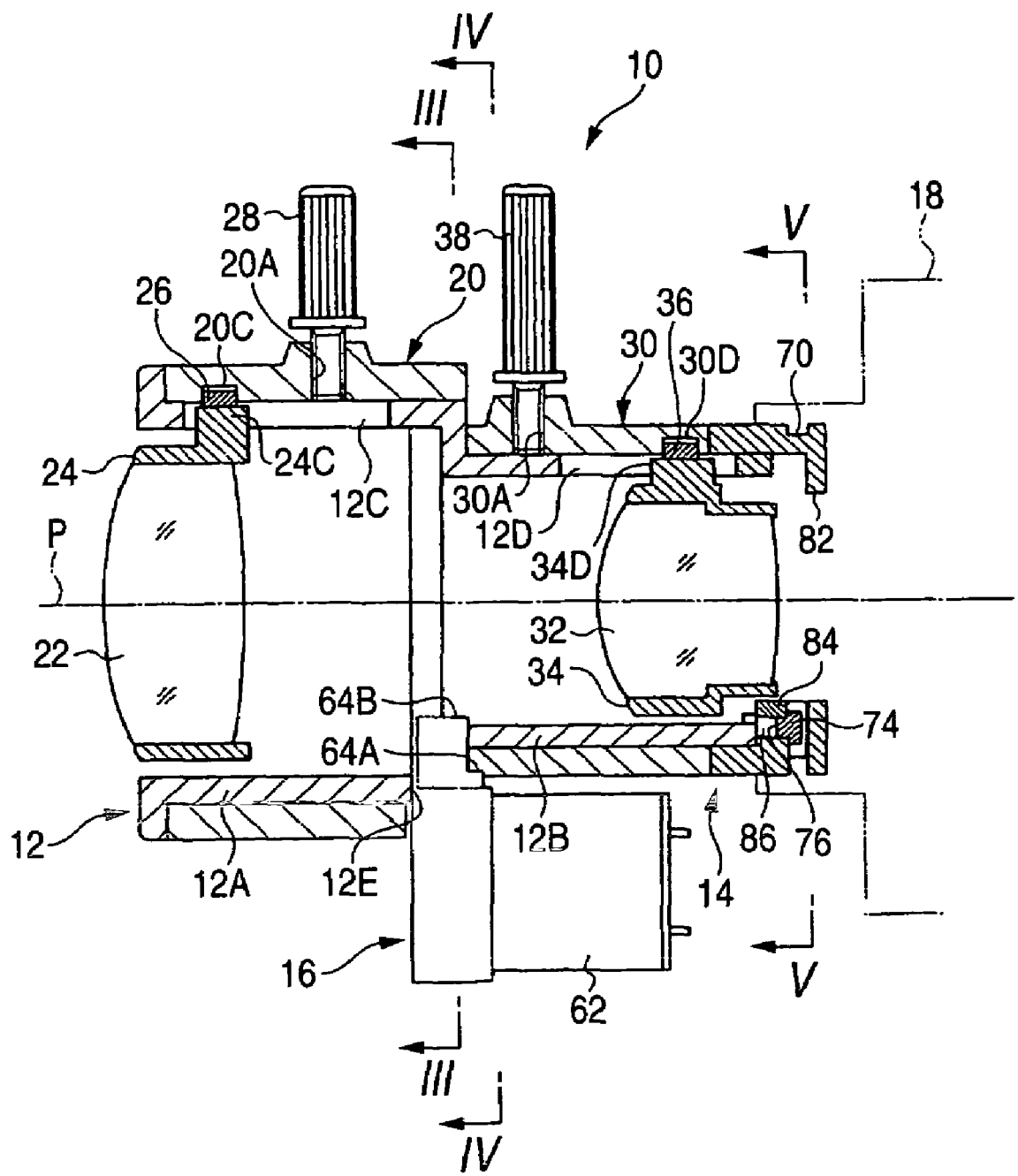
FIG. 6 is a sectional view showing a constitution of a lens barrel according to an exemplary embodiment of the invention.

FIG. 6 is a side sectional view showing a constitution of a lens barrel 10 according to a second exemplary embodiment of the invention. (The same members as those of the first embodiment have the same numerals and symbols as those of the first embodiment.)

Meanwhile, the connecting member 14 shown in FIG. 6 is a member for connecting the barrel main body 12 and the camera 18 and is formed substantially in a cylindrical shape. An outer peripheral face of the connecting member 14 is formed with a groove 70 in a recess shape over a periphery thereof, a bayonet claw of the camera 18 is engaged with the groove 70 to be connected. Further, a method of connecting the camera 18 and the connecting member 14 is not particularly limited but the camera 18 may be screwed to the connecting member 14. Further, a built-in type of the camera 18 in which CCD and a board are exposed may be used, and in this case, a recess portion is formed at the connecting member 14 and the camera 18 is screwed thereto in a state of fitting CCD of the camera 18.

The connecting member 14 according to the embodiment is connected to a base end of the small diameter portion 12B of the barrel main body 12 by using a snap in mechanism. A connecting structure thereof will be explained in reference to FIGS. 7A through 7C, FIG. 8, and FIGS. 9A through 9D as follows.

Figure 8:
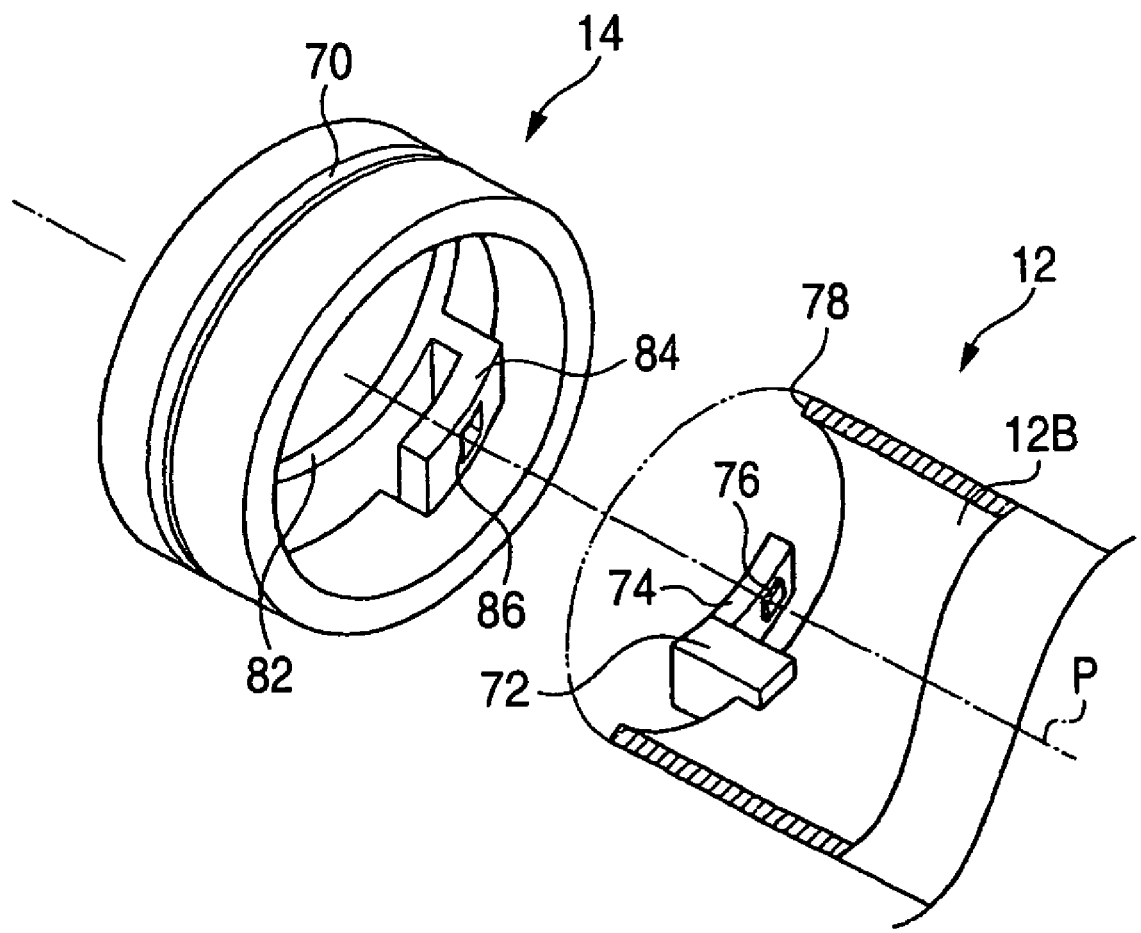
FIG. 8 is a perspective view showing a mechanism of connecting the connecting member.

FIG. 7A is a sectional view taken along a line 5-5 of FIG. 6, FIG. 7B shows only the barrel main body 12 of FIG. 7A, and FIG. 7C shows only the connecting member 14. Further, FIG. 8 is a perspective view showing a mechanism of connecting the connecting member 14 and the lens barrel 12. FIGS. 9A through 9D are explanatory views showing a connecting method, showing schematic views viewed from side of the optical axis P.

As shown by FIG. 8, an end face 78 on a base end side of the barrel main body 12 is formed with a support portion 72 to project in a direction of the optical axis P, and a front end of the support portion 72 is provided with an arm 74. The arm 74 and the support portion 72 are integrally formed with the barrel main body 12 by a resin, the arm 74 is extended in a peripheral direction from the front end of the support portion 72. The arm 74 is formed by a strength to a degree of capable of being sufficiently deformed elastically, and, for example, the front end can elastically be deformed in a direction of being remote from the end face 78 of the barrel main body 12.

The arm 74 is projected to be formed with a projected portion (claw) 76 at a face thereof on a side of the barrel main body 12. The projected portion 76 is constituted by a size of being engaged with a through hole 86, mentioned later. Further, as shown by FIG. 9A, the projected portion 76 is formed with an inclined face 76A by facing a front end side thereof, and is prevented from being caught by an engaging portion 84 when the projected portion 76 is moved in a circumferential direction.

Further, the arm 74 is arranged at a position at a distance D1 from the end face 78 of the barrel main body 12. Further, as shown by FIG. 7B, the arms 74 are arranged at positions in the peripheral direction equally divided by three.

Meanwhile, as shown by FIG. 8, the connecting member 14 is projected to be formed with a projected portion 82 over a periphery thereof at a base end of an inner peripheral face thereof. Further, an inner peripheral face of the connecting member 14 is projected to be formed with the engaging portion 84. The engaging portion 84 is formed contiguously from the projected portion 82 and is provided with a sufficient strength to a degree of not being deformed. Further, the engaging portion 84 is formed in a circumferential direction, and a thickness T1 (refer to FIG. 9A) thereof is formed by a dimension the same as the distance D1 between the arm 74 and the end face 78. Further, the interval D2 between the engaging portion 74 and the projected portion 82 is formed to be larger than a thickness T2 of the arm 74 to be able to insert the arm 74 between the engaging portion 84 and the projected portion 82. Further, an opening portion 88 penetrating an inner peripheral face and an outer peripheral face is formed between the engaging portion 84 and the projected portion 82. Therefore, it can be optically recognized from outside that the projected portion 76 of the arm 74 is engaged with the through hole 86, mentioned later.

As shown by FIG. 7C, the engaging portions 84 are provided at three locations and arranged at positions in a circumferential direction equally divided by three. Further, the respective engaging portions 84 are formed with the through holes 86 in the direction of the optical axis P to be engaged with the projected portions 76 of the arms 74.

Next, operation of the lens barrel 10 constituted as described above will be explained in reference to FIG. 9A through FIG. 9D.

When the connecting member 14 is fixed to the barrel main body 12, first, the connecting member 14 shown in FIG. 9A is made to cover the small diameter portion 12B of the barrel main body 12. Further, as shown by FIG. 9B, the end face 78 of the barrel main body 12 is pressed to the engaging portion 84 of the connecting member 14.

Next, under the state, the connecting member 14 is rotated relative to the barrel main body 12. Thereby, as shown by FIG. 9C, the front end of the arm 74 of the barrel main body 12 is inserted to between the engaging portion 84 and the projected portion 82. At this occasion, the arm 74 is inserted thereto while being elastically deformed on an outer side by an amount of the projected portion 76 of the front end.

Figure 9D:
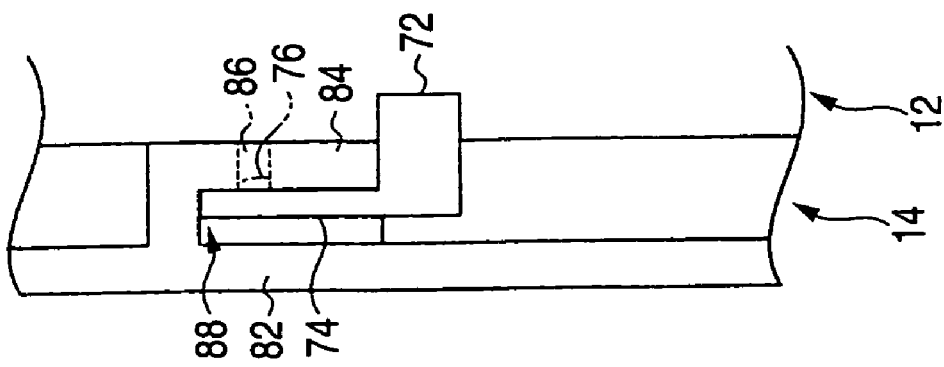
FIGS. 9A to 9D are explanatory views showing a connecting method.
Figure 9C:
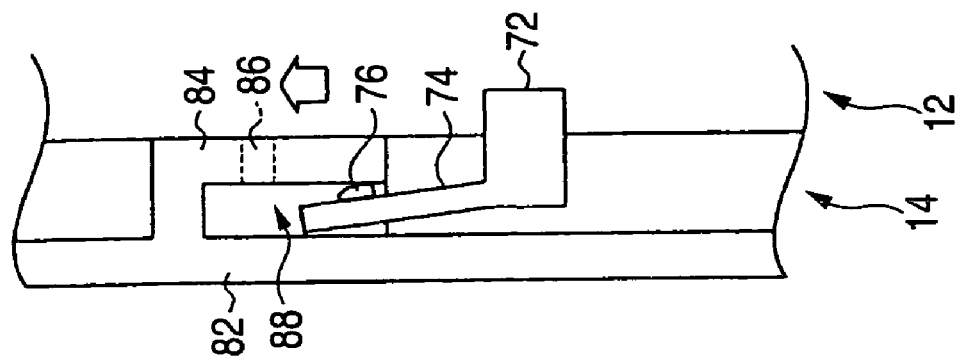
Figure 9B:
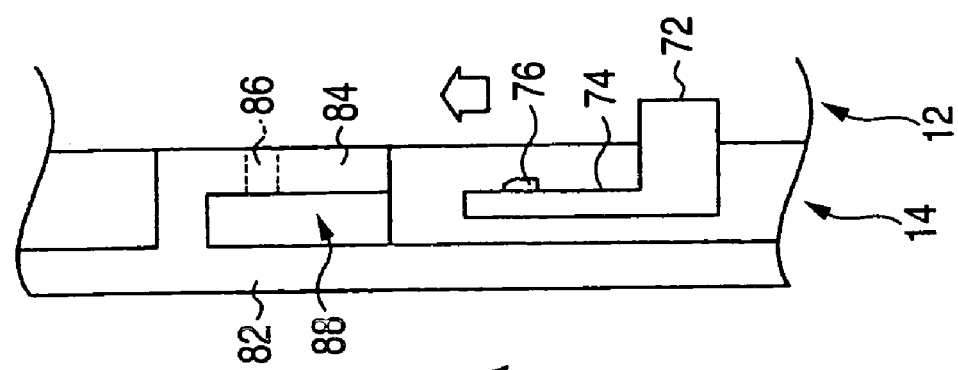
Figure 9A:
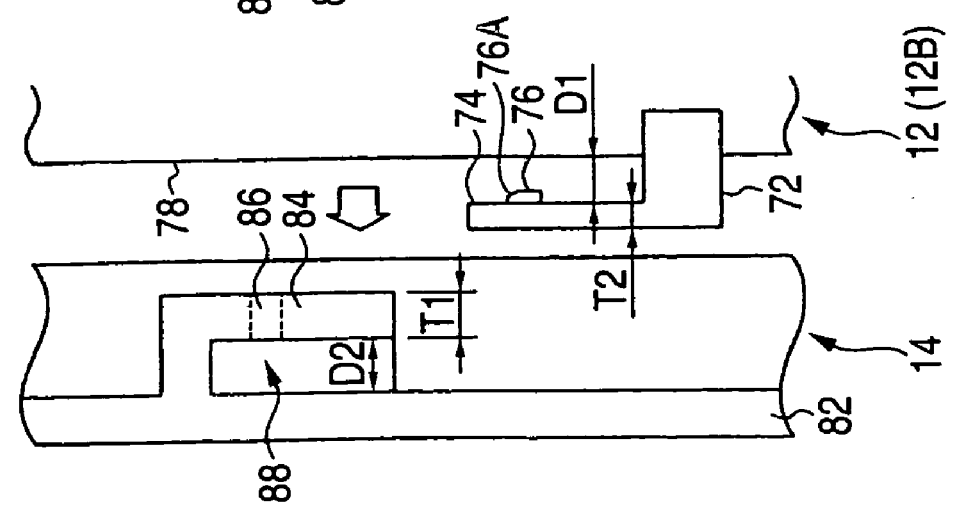

When pivoting movement of the connecting member 14 is further progressed, as shown by FIG. 9D, the projected portion 76 of the arm 74 is dropped into the through hole 86 of the engaging portion 84 by emitting sound. Further, the projected portion 76 of the arm 74 is engaged with the through hole 86 of the engaging portion 84 by an elastic force of the arm 74 per se, and the connecting member 14 is fixed to the barrel main body 12.

In this way, according to the lens barrel 10 of the embodiment, the barrel main body 12 and the connecting member 14 are connected by a snap in mechanism. That is, the projected portion 76 is engaged with the through hole 86 by the elastic force of the arm 74, and the barrel main body 12 and the connecting member 14 are connected. When connection has been carried out in this way, the connection is carried out always by a constant force by the elastic force of the arm 74 and therefore, the connected barrel main body 12 can be prevented from being warped.

Further, according to the embodiment, the arm 74 of the snap in mechanism is integrally molded with the barrel main body 12, the engaging portion 84 is integrally molded with the connecting member 14 and therefore, it is not necessary to separately use a fixing piece of a screw or the like. Further, according to the embodiment, the connecting member 14 can be connected to the barrel main body 12 by only rotating the connecting member relative to the barrel main body 12 and therefore, a tool of a screwdriver or the like is not needed. Therefore, according to the embodiment, the barrel main body 12 and the connecting member 14 can be connected easily and at low cost.

Further, according to the embodiment, the connecting member 14 is engaged with the barrel main body 12 by rotating the connecting member and therefore, the connecting member 14 and the barrel main body 12 can be connected in a state of being positioned in the direction of the optical axis P. That is, the projected portion 76 of the arm 74 can be engaged to be connected with the through hole 86 of the engaging portion 84 while maintaining a state of bringing the end face 78 of the barrel main body 12 into contact with the engaging portion 84 of the connecting member 14 to be positioned in the direction of the optical axis P. Particularly, according to the embodiment, by forming the projected portion 76 of the arm 74 on a side of the end face 78 of the barrel main body 12, the engaging portion 84 is pinched by the arm 74 and the end face 78 and therefore, a state of bringing the end face 88 and the engaging portion 84 into contact with each other can always be ensured. Therefore, according to the embodiment, the connecting member 14 and the barrel main body 12 can be connected to be positioned in the direction of the optical axis P and therefore, an optical function can be promoted.

Further, in the above-described embodiment, shapes and numbers of pieces of the projected portions 76 of the arms 74 and the through holes 86 of the engaging portion 84 are not particularly limited but the projected portions 76 and the through holes 86 may be constituted to be engaged with each other thereby. For example, a groove may be formed in place of the through hole 86 to be engaged with the projected portion 76.

Further, in the above-described embodiment, while the projected portion 76 is formed at the front end of the arm 74 and the through hole 86 is formed at the engaging portion 84 of the connecting member 14, these may be reversed. That is, a through hole may be formed at the front end of the arm 74 and an engaging portion engaging with the through hole may be formed at the engaging portion 84. Further, an arm may be formed at the connecting member 14 and an engaging portion may be formed at the barrel main body 12.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-122751, JP2005-122752 and JP2005-122753, all filed Apr. 20, 2005, the contents of which is incorporated herein by reference.

What is claimed is:

1. A lens barrel comprising:
    a barrel main body; and
    a connecting member attached to the barrel main body and connected to a camera having a front section where light enters the camera along an optical axis, the connecting member comprising:
    a first portion on a side of the barrel main body, said first portion having a front and a rear; and
    a second portion on a side of the camera, said second portion having a front and a rear, wherein
    substantially and entirety of the first and second portions are disposed (i) forward of the front section of the camera along the optical axis, and (ii) between the barrel main body and the camera, and
    the front of the second portion attaches to the rear of the first portion and the rear of the second portion attaches to the front section of the camera.

2. The lens barrel according to claim 1, further comprising an optical filter arranged between the first and second portion.

3. The lens barrel according to claim 2, wherein at least one portion of the first and second portions has a recess portion on a face opposite to the other portion, the recess portion housing the optical filter.

4. The lens barrel according to claim 1, wherein the first and second portions are fixed by one of screwing and a snap in mechanism.

5. The lens barrel according to claim 1, further comprising:
    an optical filter; and
    a unit capable of inserting or drawing the optical filter on an optical path of the lens barrel, the optical filter and the unit being integrated to the connecting member.

6. The lens barrel according to claim 5, wherein the connecting member comprises:
    a first portion on a side of the barrel main body; and
    a second portion on a side of the camera, and the connecting member is divided into the first and second portion at a position of the optical filter.

7. The lens barrel according to claim 1, wherein one of the barrel main body and the connecting member comprises an elastically deformable arm having a claw at a front end portion thereof, and the other of the barrel main body and the connecting member comprises an engaging portion engaged with the claw of the arm.

8. The lens barrel according to claim 7, wherein the arm is arranged in a peripheral direction centering on the optical axis.

* * * * *